Sept. 8, 1942.   E. F. LOWEKE   2,295,487
FLUID PRESSURE BRAKING SYSTEM
Filed Aug. 16, 1940
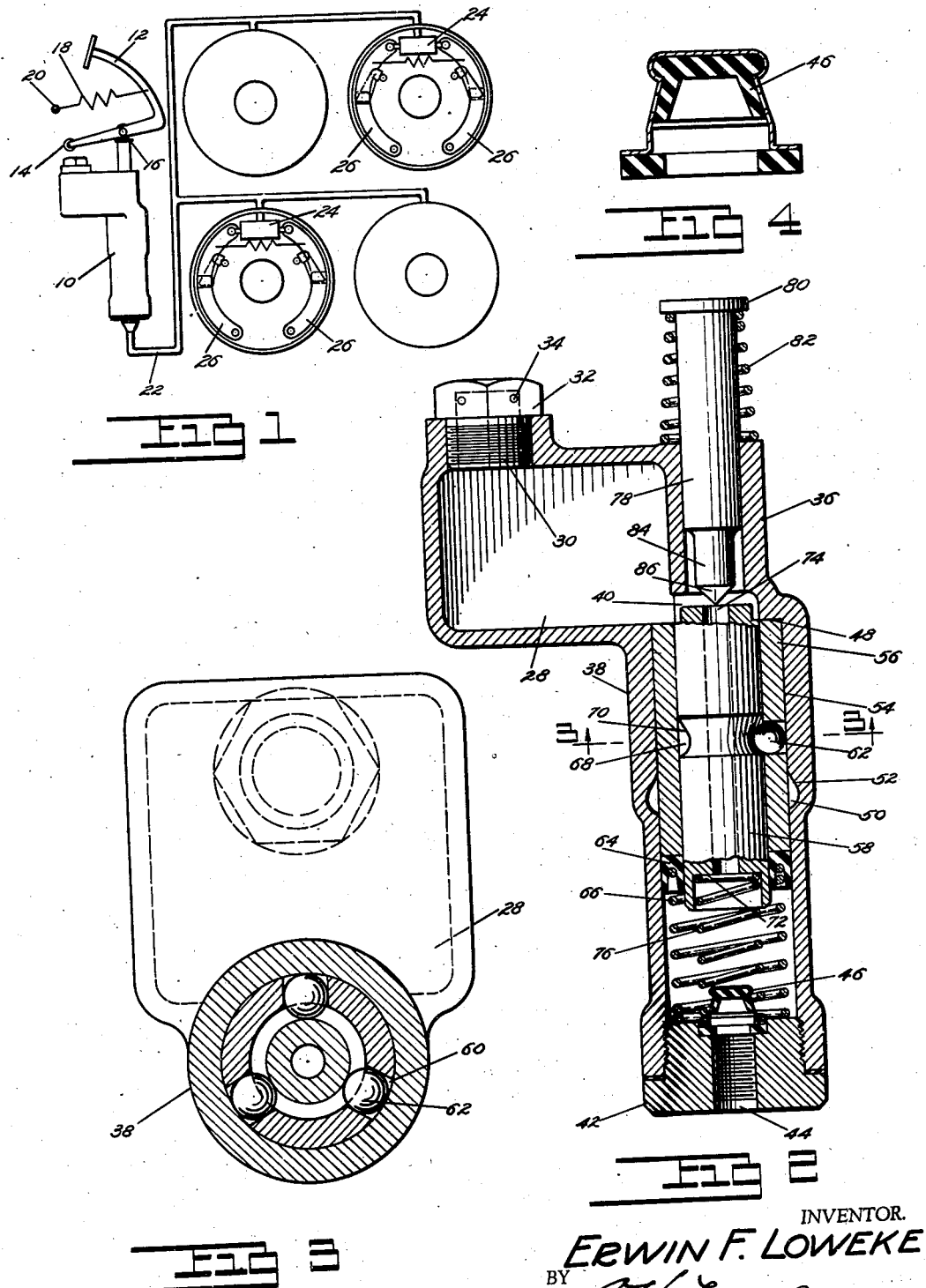
INVENTOR.
ERWIN F. LOWEKE
BY 

Patented Sept. 8, 1942

2,295,487

UNITED STATES PATENT OFFICE 2,295,487

FLUID PRESSURE BRAKING SYSTEM

Erwin F. Loweke, Detroit, Mich., assignor to Hydraulic Brake Company, Detroit, Mich., a corporation of California Application August 16, 1940, Serial No. 352,975
In Canada October 10, 1939

8 Claims. (Cl. 60—54.6)

This invention relates to fluid pressure systems, and more particularly to fluid pressure braking systems for motor vehicles.

An object of the invention is to provide a fluid pressure braking system including a fluid pressure producing device of the two-phase type operative to compound pressure on the fluid in the system without proportionately increasing the applied activating force.

Another object of the invention is to provide a fluid pressure producing device of the two-phase type operative to effect a transition from low to high pressure upon a predetermined movement.

Another object of the invention is to provide a low pressure producing means and a high pressure producing means, and associated means for locking the low and high pressure means together during the initial movement thereof and thereafter to gradually disconnect the low and high pressure means and to lock the low pressure means against movement.

Other objects and advantages of the invention will appear from the following description taken in connection with the accompanying drawing forming a part of this specification, and in which:

Fig. 1 is a schematic view of a fluid pressure braking system embodying the invention;

Fig. 2 is a vertical sectional view of the fluid pressure producing device embodied in the system;

Fig. 3 is a sectional view substantially on line 3—3, Fig. 2; and

Fig. 4 is a sectional view of a two-way valve.

Referring to the drawing for more specific details of the invention, a fluid pressure braking system illustrated in Fig. 1 includes a fluid pressure producing device indicated generally at 10. This device is of the two-phase type, operative to compound pressure on the fluid in the system, without proportionately increasing the applied activating force.

This fluid pressure producing device may be activated by a conventional foot pedal lever 12 rockable on a stub shaft 14. A roller 16 on the lever serves to transmit force to the compression element of the device, and a spring 18 connecting the lever to a fixed support 20 serves to return the lever to its retracted position.

A fluid pressure delivery pipe or conduit 22 suitably connected to the discharge port of the fluid pressure producing device has branches connected respectively to fluid pressure actuated motors 24 for actuating brakes 26. The motors are preferably arranged in pairs, one pair for actuating the brakes associated with the front wheels of the vehicle, and another pair for actuating the brakes associated with the rear wheels of the vehicle. The brakes may be of any preferred structure.

The fluid pressure producing device 10 includes a reservoir 28 having a filling opening 30 normally closed by a plug 32 having openings 34 therethrough for venting the reservoir to the atmosphere. A cylinder 36 in one end of the reservoir has one of its ends opening through the top of the reservoir and its other end opening into the reservoir adjacent the bottom thereof, and a cylinder 38 depending from the bottom of the reservoir in axial alignment with the cylinder 36 has one of its ends opening into the reservoir as at 40 and its other end closed as by a head 42 provided with a discharge port 44 controlled as by a two-way valve 46 seated on the head 42. The diameter of the cylinder 38 is larger than that of the cylinder 36, and at the adjacent ends of the cylinders is a shoulder 48. The cylinder 38 has an internal circumferential groove 50, and a portion of its wall defining this groove tapers from the bore of the cylinder downwardly and outwardly as indicated at 52 to approximately the bottom of the groove.

A compound piston 54 reciprocable in the cylinder 38 includes a low pressure piston 56 and a high pressure piston 58. The low pressure piston 56 comprises a hollow cylinder shell having substantially medially of its length a plurality of spaced openings 60 for the reception of balls 62. This low pressure piston seats, when in its retracted position, on the shoulder 48, and seated on its head is an annular sealing cup 64 held against displacement by a spring 66 interposed between the cup and the head 42 of the cylinder 38. The spring 66 serves also to return the piston 56 to its retracted position. The high pressure piston 58 reciprocable in the low pressure piston 56 has substantially medially of its length a circumferential groove 68 for the reception of the balls 62, and a portion of the wall defining this groove tapers from the perimeter of the piston inwardly and downwardly as indicated at 70 to substantially the bottom of the groove. The high pressure piston 58 has on its head a concentrically disposed spring seat 72, and an axial passage 74 providing communication between the reservoir and that portion of the cylinder 38 forward of the piston. A spring 76 interposed between the spring seat 72 on the head of the piston 58 and the two-way valve 46 controlling the discharge port 44 serves to normally retain the valve on its seat and also to return the piston 58 to its retracted position against the balls 62.

A plunger 78 reciprocable in the cylinder 36 has on its force-applying end a collar 80, and a spring 82 sleeved on the plunger between this collar and the top of the reservoir serves to return the plunger to its retracted position. On the forward end of the plunger is an extension 84 terminating in a conical head 86 adapted to enter and close the passage 74 through the high pressure piston 58.

In a normal operation, the applied activating force on the plunger 78 results in advancing the plunger against the resistance of the retractile spring 82. During the initial movement of the plunger 78, the conical head 86 on the extension 84 of the plunger enters and closes the passage 74 through the high pressure piston 58, so as to close communication between the reservoir and that portion of the cylinder 38 forward of the pistons.

Thereafter, as the plunger 78 advances, the low and high pressure pistons 56 and 58 move in unison for a predetermined stroke depending upon the location of the detent or circumferential groove 50 in the wall of the cylinder 38. Because of a differential in the areas of the low and high pressure pistons, there is a tendency toward relative movement between these pistons 56 and 58. This tendency is resisted by the locking action of the balls 62 seated in the openings 60 in the wall of the low pressure piston and in the groove 68 in the circumference of the high pressure piston until the openings 60 register with the detent or groove 50 in the wall of the cylinder 38, and, thereafter, as the pistons 56 and 58 advance on the compression stroke, the inclined surface 70 partially defining the groove 68 in the circumference of the high pressure piston 58 urges the balls 62 against the inclined surface 52 partly defining the groove 50 in the wall of the cylinder 38 until the balls are seated in the groove 50 and effectively lock the low pressure piston against further movement.

During this operation, fluid in the cylinder 38 forward of the pistons is displaced therefrom, past the two-way valve 46, through the discharge port 44 and fluid pressure delivery pipe or conduit 22 into the fluid pressure actuated motors 24, resulting in energization of the motors and the consequent actuation of the friction elements of the brakes 26.

The locking action of the low pressure piston against advance movement is effected over a wide range, due to controlled movement of the balls 62 by the cooperating inclined surfaces 52 and 70, and during this controlled locking action there is a slight differential in the rate of movement of the low and high pressure pistons. Because of these factors the transition from low to high pressure is effected in small increments tending to smooth out the operation to such an extent that the transition is not perceptible to the operator.

When the low pressure piston 56 is locked against further advance, the high pressure piston 58 proceeds independently throughout the remainder of the compression stroke, and fluid in the cylinder 38 forward of the piston is displaced therefrom, past the valve 46, and through the discharge port 44 and fluid pressure delivery pipe 22 and its branches into the motors 24, resulting in further energization of the motors and the consequent actuation of the brakes with increased force and without perceptible increase in the applied activating force.

Upon conclusion of a braking operation and release of the applied activating force, the plunger 78 returns to its retracted position under the influence of the retractile spring 82. This results in release of the piston and establishing communication between the reservoir 28 and that portion of the cylinder 38 forward of the piston by way of opening the passage 74, through the high pressure piston and also return of the low and high pressure pistons through the influence of the retractile springs 66 and 76. As the pistons return to retracted position, the high pressure piston moves in advance of the low pressure piston until the detent or groove 68 therein registers with the openings 60 in the wall of the low pressure piston, whereupon the balls 62 are moved to their normal seat in the groove 68 and openings 60 to lock the pistons together. Thereafter, the pistons move in unison to their retracted positions, the low pressure piston seating on the shoulder 48 and the high pressure piston seating on the balls 62.

During this operation, fluid in the fluid pressure actuated motors 24 and the fluid pressure delivery pipe or conduit 22 and its branches connecting the motors to the discharge port 44 is returned through the port 44, past the two-way valve 46, into the cylinder 38, under the influence of the retractile springs connecting the friction elements of the brakes 26. The fluid so returned to the cylinder 38 may be in excess of the capacity of the cylinder, and this excess fluid is displaced from the cylinder through the passage 74 in the high pressure piston 58 into the reservoir 10. The valve 46 serves to maintain a positive pressure on the fluid in the fluid pressure delivery pipe or conduit 22, the branches thereof, and the motors connected to the branches.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder having an inner circumferential groove, a hollow piston reciprocable therein having apertures adapted to register with the groove, a piston reciprocable in the hollow piston having a circumferential groove, and means shiftable in the grooves and apertures for locking the pistons together during a predetermined movement of the pistons and thereafter to release the pistons from one another and to retain one of the pistons against movement.

2. A fluid pressure producing device comprising a cylinder having an inner circumferential groove with a portion of its wall defining the groove tapered from the bore of the cylinder to the bottom of the groove, a hollow piston reciprocable in the cylinder having in its wall a plurality of spaced apertures, a piston reciprocable in the hollow piston having a circumferential groove with a portion of its wall defining the groove tapered from the circumference of the piston to the bottom of the groove in oppositely disposed relation to the tapered portion of the cylinder wall, and a plurality of balls shiftable in the grooves and apertures.

3. A fluid pressure producing device comprising a reservoir, a cylinder depending therefrom having an inner circumferential groove with a portion of its wall defining the groove tapered upwardly and inwardly, a hollow piston reciprocable in the cylinder having a plurality of spaced openings through its wall, a piston reciprocable in the hollow piston having a passage therethrough and a circumferential groove with a portion of its perimeter tapered upwardly and outwardly, a plurality of balls shiftable in the grooves and openings, and a plunger for actuating the pistons having a part adapted to enter and close the passage through the piston.

4. A fluid pressure producing device comprising a reservoir, a cylinder depending therefrom and opening into the reservoir having an inner circumferential groove with a part of its wall defining the groove inclined upwardly and inwardly from the bottom of the groove, a hollow piston having a plurality of spaced openings through its wall adapted to communicate with the groove, a piston reciprocable in the hollow piston having an axial passage therethrough and a circumferential groove adapted to communicate with the openings with a part of its perimeter defining the groove inclined upwardly and outwardly from the bottom of the groove, a plurality of balls shiftable in the grooves and openings, and a plunger for actuating the pistons having a part adapted to enter and close the axial passage upon advance of the pistons.

5. A fluid pressure producing device comprising a cylinder, telescopic pistons reciprocable therein, means acting upon one of the pistons to actuate it, and means coupling the second piston with the first piston for joint initial advance of the two pistons on the compression stroke, said means being automatically releasable upon a predetermined advance of the two pistons to permit further advance of the first piston independently of the second piston, and operable to positively lock the second piston to the cylinder to prevent the movement thereof in either direction during the independent advance of the first piston.

6. A fluid pressure producing device comprising a cylinder, telescopic pistons reciprocable therein, means acting upon one of the pistons to actuate it, and means coupling the second piston with the first piston for joint initial advance of the two pistons on the compression stroke, said means cooperating with a part of the cylinder to release the first piston and to simultaneously lock the second piston to the cylinder after a predetermined advance of the first piston to permit further advance of the first piston independently of the second piston, said second piston thereafter being restrained from movement in either direction.

7. A fluid pressure producing device comprising a cylinder, telescopic pistons reciprocable therein, means acting upon one of the pistons to actuate it, and means shiftable through the wall of the other piston to lock said piston either to the first piston for joint advance therewith, or to lock said piston to the cylinder and permit independent advance of the first piston.

8. A fluid pressure producing device comprising a cylinder having an inner pocket, a hollow piston therein having an aperture adapted to register with the pocket, a piston reciprocable in the hollow piston having a pocket on its outer circumference, and means shiftable in the pockets and aperture for locking the pistons together during a predetermined movement of the pistons and to thereafter release the pistons from one another and to retain one of the pistons against movement.

ERWIN F. LOWEKE.